United States Patent [19]

Binder et al.

[11] Patent Number: 5,288,680
[45] Date of Patent: * Feb. 22, 1994

[54] PROCESS FOR THE PREPARATION OF FINISHED DYEINGS WHICH ARE FAST TO THERMOMIGRATION: ORANGE-DYED POLYESTER FABRICS

[75] Inventors: Rudolf Binder, Maintal; Ulrich Bühler, Alzenau; Friedrich Schophoff, Frankfurt/M.; Margareta Boos, Hattersheim; Reinhard Kühn, Frankfurt, all of Fed. Rep. of Germany

[73] Assignee: Cassella Aktiengesellschaft, Frankfurt, Fed. Rep. of Germany

[ * ] Notice: The portion of the term of this patent subsequent to Apr. 7, 2009 has been disclaimed.

[21] Appl. No.: 888,248

[22] Filed: May 22, 1992

Related U.S. Application Data

[63] Continuation of Ser. No. 649,702, Jan. 28, 1991, abandoned.

[30] Foreign Application Priority Data

Feb. 9, 1990 [DE] Fed. Rep. of Germany ....... 4003887

[51] Int. Cl.$^5$ ............... C09B 29/42; C09B 67/22; D06P 3/85; D06P 5/08
[52] U.S. Cl. ............................... 8/639; 8/532; 8/533; 8/662; 8/690; 8/692; 8/695; 8/922
[58] Field of Search ............ 8/639, 662, 695

[56] References Cited

U.S. PATENT DOCUMENTS

| Re. 33,908 | 5/1992 | Tappe et al. | 8/639 |
| 4,548,613 | 10/1985 | Bode et al. | 8/638 |
| 4,678,476 | 7/1987 | Tappe et al. | 8/639 |
| 4,826,505 | 5/1989 | Nishikuri et al. | 8/688 |
| 5,069,682 | 12/1991 | Binder et al. | 8/526 |
| 5,102,425 | 4/1992 | Buhler et al. | 8/532 |

FOREIGN PATENT DOCUMENTS 1516037 6/1978 United Kingdom .

OTHER PUBLICATIONS

Chemical Abstracts, vol. 102, No. 22, Abstract No. 186653, "Monoazo dyes for polyester fiber", p. 84 (Jun. 3, 1985).
Chemical Abstracts, vol. 102, No. 22, Abstract No. 186655, "Monoazo dyes for polyester fiber", p. 84 (Jun. 3, 1985).
Chemical Abstracts, vol. 102, No. 22, Abstract No. 186656, "Red dicyanoimidazole azo dyes for polyester fibers", p. 84 (Jun. 3, 1985).

*Primary Examiner*—A. Lionel Clingman
*Attorney, Agent, or Firm*—Connolly and Hutz

[57] ABSTRACT

The present invention relates to a process for the preparation of finished dyeings of high fastness to thermomigration on fibre materials consisting completely or partly of polyester, characterized in that the material is dyed with one or more dyestuffs of the general formula I

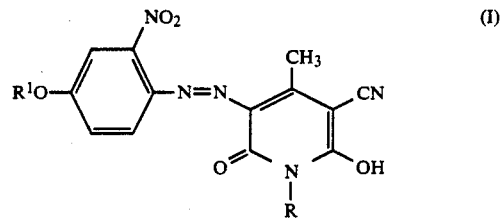

wherein
R denotes linear $(C_1-C_3)$-alkyl or $(C_3-C_6)$-alkyl which is interrupted by an oxygen atom and
$R^1$ denotes $(C_1-C_4)$-alkyl, and the dyeing thus obtained is then finished.

20 Claims, No Drawings

PROCESS FOR THE PREPARATION OF FINISHED DYEINGS WHICH ARE FAST TO THERMOMIGRATION: ORANGE-DYED POLYESTER FABRICS

This application is a continuation of application Ser. No. 07/649,702 filed Jan. 28, 1991, now abandoned.

In accordance with modern consumer habits, textile materials, specifically coloured articles of polyester fibres and blends thereof with naturally occuring fibres, for example cellulose fibres, have to meet high wash-fastness requirements. Higher quality materials are in general given a high-grade finish with synthetic resins and/or softeners to provide them with easy-care characteristics, properties such as non-iron characteristics, shrink resistance and crease resistance being particularly desirable (see, for example, Ullmanns Encyklopä die der technischen Chemie [Ullmann's Encyclopaedia of Industrial Chemistry], 4th edition, Volume 23, pages 77 et seq.).

It is generally known that the dyed materials treated in accordance with the present prior art scarcely still have satisfactory wet-fastnesses, and in particular do not have a satisfactory wash-fastness at 60° C. using domestic detergents in accordance with DIN 54017, after subsequent heat treatment, such as, for example, the thermofixing at 180° C. which is customary in practice, or after prolonged storage at room temperature. The multiple-fibre web customarily used as the concomitant material during the wash-fastness testing always shows heavy staining, its cellulose acetate fibre and polyamide fibre portions being particularly effected by this. This undesirable phenomenon is attributed to the tendency of practically all the commercially available disperse dyestuffs to undergo thermomigration. The dyestuff, which collects on the fibre surface as a result of the heat treatment, is dissolved away during washing and dyes, to a greater or lesser degree, the concomitant fabric used in the abovementioned standard test. This effect manifests itself in a particularly adverse manner, for example, on sports clothing articles of texturised polyester or polyester/cotton materials. As is known, these articles are often contrasted with white pieces of fabric of the same or a different (for example polyamide) fibre material for decoration, and these are then soiled during washing.

Examples of known dyestuffs of the prior art are C.I. Disperse Orange 151 and C.I. Disperse Orange 139. Disperse Orange 151 has a good fastness to thermomigration, but at the same time has such a high pH-sensitivity that it can be employed only with limitations for the HT dyeing processes frequently used, whereas Disperse Orange 139 can easily be dyed by the HT method, but in return has a poor fastness to thermomigration.

The present invention relates to a process for the preparation of finished dyeings of high fastness to thermomigration on fibre materials consisting completely or partly of polyester, characterised in that the material is dyed with one or more dyestuffs of the general formula I

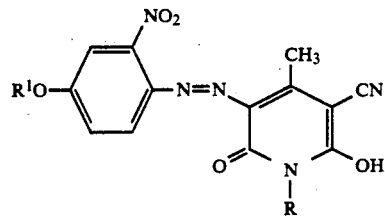

wherein
$R$ denotes linear $(C_1-C_3)$-alkyl or $(C_3-C_6)$-alkyl which is interrupted by an oxygen atom and
$R^1$ denotes $(C_1-C_4)$-alkyl,
and the dyeing thus obtained is then finished.

$R$ preferably denotes $(C_1-C_2)$-alkyl or $(C_1-C_3)$-alkoxypropyl, and particularly preferably ethyl or methoxypropyl. An alkyl radical $R^1$ can be linear or branched. $R^1$ preferably denotes $(C_1-C_2)$-alkyl, and particularly preferably methyl.

The dyestuffs of the general formula I can be employed by themselves, in mixtures with one another or alternatively in mixtures with other dyestuffs.

It is preferable for the dyestuffs of the general formula I to be employed in a mixture with red or with blue or in a mixture with red and blue dyestuffs.

Preferred red dyestuffs are dyestuffs of the general formula II

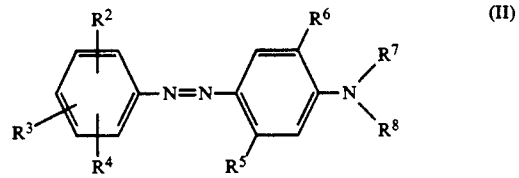

wherein
$R^2$, $R^3$ and $R^4$ independently of one another denote hydrogen, methyl, chlorine, bromine, nitro, $SO_2CH_3$, COOX or cyano, where at least one radical must be other than hydrogen;
$R^5$ denotes hydrogen, X, NHCOX or $NHSO_2CH_3$;
$R^6$ denotes hydrogen or chlorine;
$R^7$ and $R^8$ independently of one another denote hydrogen, X, $(CH_2)_nOCOX$, $(CH_2)_nCOOX$ or $(CH_2)_nCN$, where both radicals cannot simultaneously represent hydrogen;
X denotes linear $(C_1-C_4)$-alkyl, preferably $(C_1-C_2)$-alkyl, and
n denotes an integer from 1 to 4, preferably 2, dyestuffs of the general formula III

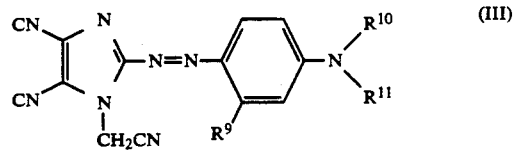

wherein
$R^9$ denotes hydrogen, chlorine, bromine or methyl and
$R^{10}$ and $R^{11}$ independently of one another denote linear $(C_1-C_4)$-alkyl, $(CH_2)_3COOCH_3$ or $(CH_2)_3COOC_2H_5$,
and the dyestuff C.I. Disperse Red 356.

Particularly preferred dyestuffs of the general formula II are those in which $R^2$ denotes o-Cl, $R^3$ denotes p-$NO_2$, $R^4$ denotes hydrogen, $R^5$ denotes $NHCOCH_3$ or $NHCOC_2H_5$, $R^6$ denotes hydrogen and $R^7$ and $R^8$ denote $CH_2CH_2OCOCH_3$, and the dyestuff where $R^2$, $R^4$ and $R^6$ are hydrogen, $R^3$ is p-$NO_2$, $R^5$ is $NHCOCH_3$ and $R^7$ and $R^8$ are $CH_2CH_2COOCH_3$.

A particularly preferred dyestuff of the general formula III is the dyestuff where $R^9$ is $CH_3$, $R^{10}$ is n-$C_4H_9$ and $R^{11}$ is $(CH_2)_3COOC_2H_5$.

Preferred blue dyestuffs are dyestuffs of the general formula IV

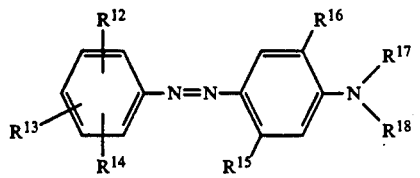

wherein
$R^{12}$, $R^{13}$ and $R^{14}$ independently of one another denote hydrogen, methyl, chlorine, bromine, nitro, $SO_2CH_3$, COOX or cyano, where at least one radical must be other than hydrogen;

$R^{15}$ denotes hydrogen, X, NHCOX or $NHSO_2CH_3$;

$R^{16}$ denotes hydrogen or OY;

$R^{17}$ and $R^{18}$ independently of one another denote hydrogen, X, $(CH_2)_nOCOX$, $(CH_2)_nCOOX$ or $(CH_2)_nCN$, where both radicals cannot simultaneously represent hydrogen;

X denotes linear $(C_1-C_4)$-alkyl, preferably $(C_1-C_2)$-alkyl;

n denotes an integer from 1 to 4, preferably 2, and

Y denotes linear $(C_1-C_4)$-alkyl, preferably $(C_1-C_2)$-alkyl, or $(C_3-C_6)$-alkyl which is interrupted by an oxygen atom, preferably $(C_1-C_2)$-alkoxyethyl, dyestuffs of the general formula V

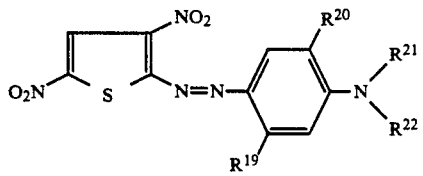

wherein
$R^{19}$ denotes hydrogen, X, NHCOX or $NHSO_2CH_3$;
$R^{20}$ denotes hydrogen or chlorine;
$R^{21}$ and $R^{22}$ independently of one another denote hydrogen, X, $(CH_2)_nOH$, $(CH_2)_nOCOX$, $(CH_2)_nCOOX$ or $(CH_2)_nCN$, where both radicals cannot simultaneously represent hydrogen;

X denotes linear $(C_1-C_4)$-alkyl, preferably $(C_1-C_2)$-alkyl and n denotes an integer from 1 to 4, preferably 2,
and dyestuffs of the general formula VI

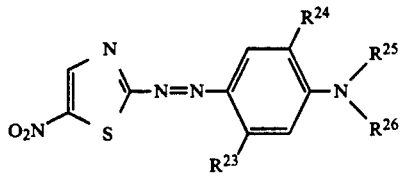

wherein
$R^{23}$ denotes hydrogen, X, NHCOX or $NHSO_2CH_3$;
$R^{24}$ denotes hydrogen or OY;
$R^{25}$ and $R^{26}$ independently of one another denote hydrogen, X, $(CH_2)_nOCOOX$, $(CH_2)_nOCOX$, $(CH_2)_nCOOX$ or $(CH_2)_nCN$, where both radicals cannot simultaneously represent hydrogen;

X denotes linear $(C_1-C_4)$-alkyl, preferably $(C_1-C_2)$-alkyl;

n denotes an integer from 1 to 4, preferably 2, and

Y denotes linear $(C_1-C_4)$-alkyl, preferably $(C_1-C_2)$-alkyl, or $(C_3-C_6)$-alkyl which is interrupted by an oxygen atom, preferably $(C_1-C_2)$-alkoxyethyl.

Particularly preferred dyestuffs of the general formula IV are those in which $R^{12}$ and $R^{13}$ denote o- and p-$NO_2$, $R^{14}$ denotes o-Cl or Br, $R^{15}$ denotes $NHCOCH_3$, $R^{16}$ denotes $OCH_3$ or $OC_2H_5$ and $R^{17}$ and $R^{18}$ denote $CH_2CH_2OCOCH_3$, and dyestuffs in which $R^{12}$ and $R^{13}$ denote o- and p-$NO_2$, $R^{14}$ denotes o-Cl, $R^{15}$ denotes $NHCOCH_3$, $R^{16}$ denotes hydrogen or $OCH_3$ and $R^{17}$ and $R^{18}$ denote $CH_2CH_2COOCH_3$. A particularly preferred dyestuff of the general formula IV is also the dyestuff where $R^{12}$ and $R^{13}$ are o- and p-$NO_2$, $R^{14}$ is o-CN, $R^{15}$ is $NHCOCH_3$, $R^{16}$ is hydrogen and $R^{17}$ and $R^{18}$ are ethyl.

Particularly preferred dyestuffs of the general formula V are those in which $R^{19}$ and $R^{20}$ denote hydrogen and $R^{21}$ and $R^{22}$ denotes $CH_2CH_2OH$ or $CH_2CH_2COOCH_3$.

Particularly preferred dyestuffs of the general formula VI are those in which $R^{23}$ denotes $NHCOCH_3$, $R^{24}$ denotes hydrogen or $OCH_3$ and $R^{25}$ and $R^{26}$ denote $CH_2CH_2OCOOC_2H_5$.

The ratio of the various dyestuffs in the dyestuff mixtures can vary within relatively wide limits. The amount by weight of the dyestuff of the general formula I or of the mixture of dyestuffs of the general formula I is preferably 5 to 98%, particularly preferably 60 to 95% for orange dyeings and 15 to 65% for black mixtures.

The amount by weight of the dyestuffs of the general formulae II to VI or Disperse Red 356 or mixtures thereof is preferably 2 to 95%.

For orange dyeings, the amount by weight of the dyestuffs of the general formulae II or III or Disperse Red 356 is particularly preferably 0 to 40%, especially preferably 0 to 15%, and the amount by weight of the dyestuffs of the general formula IV to VI is 0 to 40%, especially preferably 0 to 5%. For black dyeings, the particularly preferred amounts by weight of the dyestuffs of the general formulae II or III or Disperse Red 356 are 5 to 25%, and those of the dyestuffs of the general formulae IV to VI are 30 to 60%.

The dyestuffs of the general formulae I to VI and Disperse Red 356 are known and can be prepared by methods which are known to the expert, and the azo dyestuffs in particular can be prepared by azo coupling.

Dyestuff mixtures can be prepared by mixing the individual dyestuff components which have been prepared and finished separately. This mixing can be effected in suitable mixers or mills or else alternatively by stirring into the dye liquor. However, it is preferable for the individual dyestuff components which have been prepared separately to be finished together, it being possible for the mixing to take place immediately before spray-drying in the case of the preparation of dyestuff powders, and preferably before grinding in the case of dyestuff powders and liquid dyestuff preparations.

Dyeing with the dyestuffs and dyestuff mixtures mentioned is carried out in a manner which is known per se, preferably from an aqueous dye liquor, if appropriate in the presence of carriers, at between 80° to about 110° C. by the exhaustion process or by the HT process in a dyeing autoclave at 110° to 140° C., or by the so-called thermosol process, in which the goods are padded with the dye liquor and the dyeing is then fixed at about 200° to 230° C. The materials mentioned can be printed in a manner which is known per se by a procedure in which the dyestuffs or dyestuff mixtures are incorporated into a printing paste and the goods printed with this paste are treated with HT steam, pressurised steam or dry heat at temperatures between 120° and 230° C. for fixing of the dyestuff, if appropriate in the presence of a carrier.

The dyestuffs or dyestuff mixtures according to the invention should be present in the finest possible distribution in the dye liquors and printing pastes employed in the above applications. Fine distribution of the dyestuffs is effected in a manner which is known per se by a procedure in which the dyestuff obtained during the manufacture is suspended in a liquid medium, preferably in water, together with dispersing agents and the mixture is exposed to the action of shearing forces, the dyestuff particles originally present being comminuted mechanically to the extent that an optimum specific surface area is achieved and sedimentation of the dyestuff is as low as possible. The particle sizes of the dyestuffs are in general between 0.5 and 5 $\mu$m, preferably about 1 $\mu$m.

The dispersing agents also used in the grinding operation can be non-ionic or anionic. Non-ionic dispersing agents are, for example, reaction products of alkylene oxides, such as, for example, ethylene oxide or propylene oxide, with alkylateable compounds, such as, for example, fatty alcohols, fatty amines, fatty acids, phenols, alkylphenols and carboxylic acid amides. Examples of anionic dispersing agents are ligninsulphonates, alkyl- or alkylarylsulphonates or alkylaryl polyglycol ether sulphates.

For most modes of use, the dyestuff formulations thus obtained should be pourable. The dyestuff and dispersing agent content is therefore limited in these cases. The dispersions are in general adjusted to a dyestuff content of up to 50 percent by weight and a dispersing agent content of up to about 25%. For economic reasons, the dyestuff contents usually do not fall below 15 percent by weight.

The dispersions can also additionally contain further auxiliaries, for example those which act as oxidising agents, such as, for example, sodium m-nitrobenzenesulphonate, or fungicidal agents, such as, for example, sodium o-phenyl-phenolate and sodium pentachlorophenolate.

The dyestuff dispersions thus obtained can very advantageously be used for preparation of printing pastes and dye liquors. They offer particular advantages, for example, in the continuous process, in which the dyestuff concentration of the dye liquors must be kept constant by continuous feeding of dyestuff into the running apparatus.

Powder formulations are preferred for certain fields of use. These powders contain the dyestuff or the dyestuff mixture, dispersing agents and other auxiliaries, such as, for example, wetting agents, oxidising agents, preservatives and dust removal agents.

A preferred preparation process for pulverulent dyestuff formulations comprises removing the liquid from the liquid dyestuff dispersions described above, for example by vacuum drying or freeze-drying or by drying on roller driers, but preferably by spray-drying.

To prepare the dye liquors, the required amounts of the dyestuff formulations which have been prepared in accordance with the above comments are diluted with the dyeing medium, preferably with water, to the extent that a liquor ratio of 1:5 to 1:50 results for the dyeing. Other dyeing auxiliaries, such as dispersing, wetting and fixing auxiliaries, are in general additionally added to the liquors.

If the dyestuff or dyestuff mixture is to be used for textile printing, the required amounts of the dyestuff formulations are kneaded to give printing pastes together with thickeners, such as, for example, alkali metal alginates or the like, and if appropriate other additives, such as, for example, fixing accelerators, wetting agents and oxidising agents.

The finishing which follows the dyeing is carried out by known processes, which can be found in the relevant technical literature (see, for example, Ullmanns Encyklopädie der technischen Chemie [Ullmann's Encyclopaedia of Industrial Chemistry], 4th edition, Volume 23, pages 77 et seq. and the literature cited therein), and are thus known to the expert.

Preferred processes are, for example, the dry cross-linking process, the shock drying condensation process and the postcure process.

Chemicals which are suitable for crosslinking the cellulose molecules of the fibres can be used in these processes for high-grade finishing of polyester/cellulose blended fabrics.

Preferred chemicals are N-hydroxymethyl or N-methoxymethyl derivatives of urea, such as, for example, bis(hydroxymethyl)urea and bis(methoxymethyl)urea, of melamine, such as, for example, hexamethoxymethylmelamine, of 2-imidazolidinones, such as, for example, bis(hydroxymethyl)ethyleneurea and bis(hydroxymethyl)dihydroxyethyleneurea, or of other heterocyclic compounds, such as, for example, bis(hydroxymethyl)-propyleneurea, bis(hydroxymethyl)-hexahydrotriazinones and bis(methoxymethyl)urone.

The finishing can also comprise treatment with softeners. Softeners which are used are, in particular, compounds which have a hydrophilic and a hydrophobic molecular moiety, but which otherwise can have very different structures. Anionic softeners are, for example, fatty acid salts, salts of sulphuric acid esters or sulphonic acids and condensation products of fatty acids with compounds which contain sulphonate groups. Examples of non-ionic softeners are oxyethylation products of fatty acids, fatty alcohols, fatty acid amides and fatty amines. Cationic softeners, such as, for example, salts or quaternised compounds of tertiary amines, amino esters and aminoamides, are preferred.

The process according to the invention produces dyeings which are outstandingly fast to thermomigration on fibre materials consisting completely or partly of polyester, preferably on fibre materials of polyesters and naturally occurring fibre materials, particularly preferably on polyester/cellulose fibres.

Preferred polyesters here are high molecular weight polyesters, in particular polyethylene glycol terephthalates. When the dyestuffs of the general formula I are used by themselves or in suitable mixtures with red or blue dyestuffs of the general formulae II to VI, orange dyeings which are identical in colour shade to those obtained from the widely used dyestuffs C.I. Disperse Orange 29 and 30 but do not have the disadvantage of these of low fastness to thermomigration can be obtained.

Given suitable mixing ratios of the dyestuffs, not only orange but also yellow-brown and brown dyeings can be obtained.

Finally, suitable mixtures of the dyestuffs of the general formula I with red and blue dyestuffs of the formulae II to IV give black dyeings of high fastness to thermomigration.

The invention is illustrated in more detail by the following examples. Percentage data are percentages by weight.

EXAMPLE 1

1.0 g of the dyestuff of the general formula I in which $R^1$ denotes methyl and R denotes ethyl is stirred in finely dispersed form into 2000 ml of water. 2.0 g of sodium acetate and 1.0 g of a commercially available dispersing agent based on a naphthalene-sulphonic acid-formaldehyde condensate are added to the dispersion thus obtained and the pH is brought to 4–5 with acetic acid. 100 g of a polyester/cellulose 70:30 blended fabric are introduced into the dye liquor thus obtained and dyeing is carried out at 130° C. for 45 minutes. The fabric is then rinsed, after-treated reductively with a 0.2% strength sodium dithionite solution at 70° to 80° C. for 15 minutes, rinsed again and dried. The dyeing thus prepared is subjected to high-grade finishing by impregnating it with an aqueous solution containing, per liter, 40 g of a reactive resin based on dimethyloldihydroxyethyleneurea, 20 g of a melamine resin based on partly etherified methylolmelamines, 20 g of a non-ionic polyethylene emulsion, 20 g of an anionic softener based on silicone and 8 g of a catalyst based on an amine salt, then drying it at 100° C. for one minute and heating it at 180° C. for 30 seconds. A deep orange dyeing with a high-grade finish, very good coloristic properties and a perfect wash-fastness at 60° C. using ECE detergents in accordance with DIN 54017/C2 is obtained in this manner.

EXAMPLE 2

Comparison Example 1.0 g of the dyestuff of the general formula I in which $R^1$ denotes methyl and R denotes 2-ethylhexyl is stirred in finely dispersed form into 2000 ml of water. 2.0 g of sodium acetate and 1.0 g of a commercially available dispersing agent based on a naphthalenesulphonic acid-formaldehyde condensate are added to the dispersion thus obtained and the pH is brought to 4–5 with acetic acid. 100 g of a polyester/cellulose 70:30 blended fabric are introduced into the dye liquor thus obtained and dyeing is carried out at 130° C. for 45 minutes. The fabric is then rinsed, after-treated reductively with a 0.2% strength sodium dithionite solution at 70° to 80° C. for 15 minutes, rinsed again and dried. The dyeing thus prepared is subjected to high-grade finishing by impregnating it with an aqueous solution containing, per liter, 40 g of a reactive resin based on dimethyloldihydroxyethyleneurea, 20 g of a melamine resin based on partly etherified methylolmelamines, 20 g of a non-ionic polyethylene emulsion, 20 g of an anionic softener based on silicone and 8 g of a catalyst based on an amine salt, then drying it at 100° C. for one minute and heating it at 180° C. for 30 seconds. A deep orange dyeing with a high-grade finish, good coloristic properties but a poor wash-fastness at 60° C. using ECE detergents in accordance with DIN 54017/C2, in particular with heavy soiling of the polyamide content in the multiple-fibre tape, is obtained in this manner.

EXAMPLES 3 TO 7

Deep orange dyeings with very good fastness properties are obtained in the same manner as described in Example 1 using the dyestuffs listed in the following table.

| | Dyestuff of the general formula I | |
|---|---|---|
| Example | $R^1$ | R |
| 3 | Methyl | Methyl |
| 4 | Methyl | 2-Ethoxyethyl |
| 5 | Methyl | 3-Methoxypropyl |
| 6 | Methyl | 3-Ethoxypropyl |
| 7 | Methyl | 2-Isopropoxyethyl |

EXAMPLE 8

20.0 g of the dyestuff of the general formula I in which $R^1$ denotes methyl and R denotes ethyl are incorporated in fine distribution into a printing paste containing 45.0 g of carob bean flour, 6.0 g of sodium m-nitrobenzenesulphonate and 3.0 g of citric acid per 1000 g. When polyester/cellulose blended fabric is printed with this printing paste and the printed fabric is dried, steamed under a stream pressure of 1.5 atmospheres gauge, rinsed, soaped, rinsed again and subjected to finishing as described in Example 1, a deep orange print of very good coloristic properties is obtained.

EXAMPLE 9

A mixture of 0.921 g of the dyestuff of the general formula I in which $R^1$ denotes methyl and R denotes ethyl, in the finished form, 0.077 g of the red dyestuff of the general formula II in which $R^2$ denotes o-chloro, $R^3$ denotes p-nitro, $R^5$ denotes $NHCOCH_3$, $R^4$ and $R^6$ denote hydrogen and $R^7$ and $R^8$ denotes $CH_2CH_2OCOCH_3$, in finished form, and 0.002 g of the blue dyestuff of the general formula IV in which $R^{12}$ and $R^{13}$ denote o,p-nitro, $R^{14}$ denotes o-chloro, $R^{15}$ denotes $NHCOCH_3$, $R^{16}$ denotes $OCH_3$ and $R^{17}$ and $R^{18}$ denote $CH_2CH_2OCOCH_3$, in finished form, is employed for the preparation of a highly finished dyeing as described in Example 1. A dyeing having the colour shade of Orange 29 but a very good fastness to thermomigration is obtained.

EXAMPLE 10

A mixture of 0.908 g of the dyestuff of the general formula I in which $R^1$ denotes methyl and R denotes ethyl, in finished form, 0.090 g of the red dyestuff of the general formula III in which $R^9$ denotes $CH_3$, $R^{10}$ denotes $n-C_4H_9$ and $R^{11}$ denotes $CH_2CH_2CH_2COOCH_3$, in finished form, and 0.002 g of the blue dyestuff of the formula IV in which $R^{12}$ and $R^{13}$ denote o,p-nitro, $R^{14}$ denotes o-chloro, $R^{15}$ denotes $NHCOCH_3$, $R^{16}$ denotes $OCH_3$ and $R^{17}$ and $R^{18}$ denote $CH_2CH_2OCOCH_3$, in finished form, is employed for the preparation of a highly finished dyeing as described in Example 1. A dyeing having the colour shade of Orange 29 but a very good fastness to thermomigration is obtained.

We claim:

1. A dyeing and finishing process resulting in dyeings which are highly fast to thermomigration on fibre materials containing polyester, characterized in that the material is dyed with one or more dyestuffs of the general formula

[Structure (I): 4-R¹O-phenyl with 2-NO₂ group, connected via N=N to a pyridone ring bearing CH₃, CN, OH, and N-R substituents, with C=O]

wherein
R denotes linear (C₁–C₃)-alkyl or (C₃–C₆)-alkyl which is interrupted by an oxygen atom and
R¹ denotes (C₁–C₄)-alkyl,
and the dyeing thus obtained is then finished.

2. Process according to claim 1, characterized in that R denotes ethyl or methoxypropyl.

3. Process according to claim 1 characterized in that R¹ denotes methyl.

4. Process according to claim 1 characterized in that the dyestuffs of the general formula I are employed in a mixture with red or blue dyestuffs or in a mixture with both red and blue dyestuffs.

5. Process according to claim 4, characterized in that the red dyestuffs are
a) dyestuffs of the general formula II

[Structure (II): disubstituted phenyl (R², R³, R⁴) connected via N=N to phenyl with R⁵, R⁶ and NR⁷R⁸ group]

wherein
R², R³ and R⁴ independently of one another denote hydrogen, methyl, chlorine, bromine, nitro, SO₂CH₃, COOX or cyano, where at least one radical must be other than hydrogen;
R⁵ denotes hydrogen, X, NHCOX or NHSO₂CH₃;
R⁶ denotes hydrogen or chlorine;
R⁷ and R⁸ independently of one another denote hydrogen, X, (CH₂)ₙOCOX, (CH₂)ₙCOOX or (CH₂)ₙCN, where both radicals cannot simultaneously represent hydrogen;
X denotes linear (C₁–C₄)-alkyl,
n denotes an integer from 1 to 4,
b) dyestuffs of the general formula III

[Structure (III): dicyanomethylene-imidazole type ring with CH₂CN substituent, connected via N=N to phenyl bearing R⁹ and NR¹⁰R¹¹]

wherein
R⁹ denotes hydrogen, chlorine, bromine or methyl and
R¹⁰ and R¹¹ independently of one another denote linear (C₁–C₄)-alkyl, (CH₂)₃COOCH₃ or (CH₂)₃COOC₂H₅, or
c) the dyestuff C.I. Disperse Red 356.

6. Process according to claim 5 wherein X denotes linear (C₁–C₂)-alkyl and n denotes 2 in formula (II).

7. Process according to claim 4, characterized in that the blue dyestuffs are
a) dyestuffs of the general formula IV

[Structure (IV): phenyl with R¹², R¹³, R¹⁴ connected via N=N to phenyl with R¹⁵, R¹⁶ and NR¹⁷R¹⁸]

wherein
R¹², R¹³ and R¹⁴ independently of one another denote hydrogen, methyl, chlorine, bromine, nitro, SO₂CH₃, COOX or cyano, where at least one radical must be other than hydrogen;
R¹⁵ denotes hydrogen, X, NHCOX or NHSO₂CH₃;
R¹⁶ denotes hydrogen or OY;
R¹⁷ and R¹⁸ independently of one another denote hydrogen, X, (CH₂)ₙOCOX, (CH₂)ₙCOOX or (CH₂)ₙCN, where both radicals cannot simultaneously represent hydrogen;
X denotes linear (C₁–C₄)-alkyl,
n denotes an integer from 1 to 4,
Y denotes linear (C₁–C₄)-alkyl or (C₃–C₆)-alkyl which is interrupted by an oxygen atom,
b) dyestuffs of the general formula

[Structure (V): thiophene ring with O₂N and NO₂ substituents, connected via N=N to phenyl bearing R¹⁹, R²⁰ and NR²¹R²²]

wherein
R¹⁹ denote hydrogen, X, NHCOX or NHSO₂CH₃;
R²⁰ denotes hydrogen or chlorine;
R²¹ and R²² independently or one another denote hydrogen, X, (CH₂)ₙOH, (CH₂)ₙOCOX, (CH₂)ₙCOOX or (CH₂)ₙCN, where both radicals cannot simultaneously represent hydrogen;
X denotes linear (C₁–C₄)-alkyl,
n denotes an integer from 1 to 4, or
c) dyestuffs of the general formula VI

[Structure (VI): thiazole-type ring with O₂N substituent, connected via N=N to phenyl bearing R²³, R²⁴ and NR²⁵R²⁶]

wherein
R²³ denotes hydrogen, X, NHCOX or NHSO₂CH₃;
R²⁴ denotes hydrogen or OY;

$R^{25}$ and $R^{26}$ independently of one another denote hydrogen, X, $(CH_2)_nOCOOX$, $(CH_2)_nOCOX$, $(CH_2)_nCOOX$ or $(CH_2)_nCN$, where both radicals cannot simultaneously represent hydrogen;

X denotes linear $(C_1-C_4)$-alkyl, n denotes an integer from 1 to 4,

Y denotes linear $(C_1-C_4)$-alkyl or $(C_3-C_6)$-alkyl which is interrupted by an oxygen atom.

8. Process according to claim 7 wherein X denotes $(C_1-C_2)$-alkyl, n denotes 2, and Y denotes $(C_1-C_2)$-alkyl or $(C_1-C_2)$-alkoxyethyl in formula (IV).

9. Process according to claim 7 wherein X denotes $(C_1-C_2)$-alkyl and n denotes 2 in formula (V).

10. Process according to claim 7 wherein X denotes $(C_1-C_2)$-alkyl, n denotes 2, and Y denotes $(C_1-C_2)$-alkyl or $(C_1-C_2)$-alkoxyethyl in formula (VI).

11. The process as claimed in claim 5, wherein X denotes $(C_1-C_2)$-alkyl.

12. The process as claimed in claim 5, wherein n denotes the integer 2.

13. The process as claimed in claim 1, wherein R is $(C_1-C_2)$-alkyl or $(C_1-C_3)$-alkoxypropyl.

14. The process as claimed in claim 5, wherein $R^2$ denotes o-Cl, $R^3$ denotes p-$NO_2$, $R^4$ denotes hydrogen, $R^5$ denotes $NHCOC_3$ or $NHCOC_2H_5$, $R^6$ denotes hydrogen and $R^7$ and $R^8$ denote $CH_2CH_2OCOCH_3$.

15. The process as claimed in claim 5, wherein $R^2$, $R^4$ and $R^6$ are hydrogen, $R^3$ is p-$NO_2$, $R^5$ is $NHCOCH_3$, and $R^7$ and $R^8$ are $CH_2CH_2COOC_3$.

16. The process as claimed in claim 5, wherein $R^9$ is $CH_3$, $R^{10}$ is n-$C_4H_9$, and $R^{11}$ is $(CH_2)_3COOC_2H_5$.

17. The process as claimed in claim 7, wherein $R^{19}$ and $R^{20}$ denote hydrogen and $R^{21}$ and $R^{22}$ denotes $CH_2CH_2OH$ or $CH_2CH_2COOCH_3$.

18. The process as claimed in claim 7, wherein $R^{23}$ denotes $NHCOCH_3$, $R^{24}$ denotes hydrogen or $OCH_3$ and $R^{25}$ and $R^{26}$ denote $CH_2CH_2OCOOC_2H_5$.

19. A process for dyeing and finishing resulting in dyeings which are highly fast to thermomigration on fibre materials containing polyester, comprising dyeing the material with one or more dyestuffs of the general formula (I)

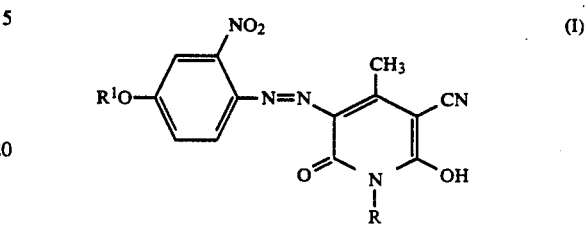

wherein

R denotes linear $(C_1-C_3)$-alkyl or $(C_3-C_6)$-alkyl which is interrupted by an oxygen atom and $R^1$ denotes $(C_1-C_4)$-alkyl, and finishing the material.

20. Process according to claim 1 wherein the dyeing is finished by the dry crosslinking process, the shock drying condensation process, or the postcure process.

* * * * *